United States Patent [19]

Buchanan et al.

[11] Patent Number: 4,684,672

[45] Date of Patent: Aug. 4, 1987

[54] NOVEL RUBBER CONNECTORS AND OTHER RUBBER PARTS FOR USE IN HUMAN INFUSION SETS AND RUBBER

[76] Inventors: Robert L. Buchanan, 954 Mystic La., Norristown, Pa. 19403; Henry F. Dull, Jr., 246 Park Rd., Ambler, Pa. 19002

[21] Appl. No.: 711,330

[22] Filed: May 13, 1985

Related U.S. Application Data

[63] Continuation of Ser. No. 668,222, Nov. 5, 1984, abandoned, which is a continuation-in-part of Ser. No. 457,099, Jan. 10, 1983, abandoned.

[51] Int. Cl.$^4$ .......................... A61K 6/10; C08K 5/01; C08K 8/00; C08L 9/00
[52] U.S. Cl. .................................... 523/100; 523/105; 523/122; 524/487; 524/488; 524/519; 524/525; 524/526; 525/105; 525/194; 525/235; 525/236; 525/237
[58] Field of Search ........................ 523/100, 122, 105; 524/487, 488, 519, 525, 526; 525/105, 194, 236, 237, 235

[56] References Cited

U.S. PATENT DOCUMENTS

| | | | |
|---|---|---|---|
| Re. 28,688 | 1/1976 | Cook | 525/104 |
| Re. 30,406 | 9/1980 | Fischer | 525/194 |
| 2,832,748 | 4/1958 | Stafford et al. | 525/194 |
| 2,867,603 | 1/1959 | Stafford et al. | 525/105 |
| 3,123,583 | 3/1964 | Howard et al. | 525/198 |
| 3,452,120 | 6/1969 | Arnold | 525/198 |
| 3,597,499 | 8/1971 | Daumiller et al. | 525/227 |
| 3,821,158 | 6/1974 | Westermann et al. | 525/194 |
| 3,883,145 | 5/1975 | Cox et al. | 260/998.14 |
| 3,919,356 | 11/1975 | Boyer | 524/405 |
| 3,928,259 | 12/1975 | Feniak | 525/236 |
| 4,202,801 | 5/1980 | Petersen | 525/237 |
| 4,218,349 | 8/1980 | Minatono et al. | 524/517 |
| 4,218,548 | 8/1980 | Mageli et al. | 525/313 |
| 4,268,637 | 5/1981 | Weldy | 525/105 |
| 4,284,743 | 8/1981 | Giuliani et al. | 525/139 |
| 4,410,648 | 10/1983 | Kato et al. | 524/236 |
| 4,460,748 | 7/1984 | Raver | 525/296 |

FOREIGN PATENT DOCUMENTS 837525 7/1958 United Kingdom.

OTHER PUBLICATIONS

Campbell et al., NR Technology, vol. 9, Part II, pp. 21–31 (1978).

Smith "Recent Progress in the Formulation of Crude Rubber", vol. 26 (269) 1979, Officiel des Plastiques da Caoutchouc.

Stile "Introduction to Polymer Chemistry" 1962, pp. 153–154.

*Primary Examiner*—Herbert J. Lilling
*Attorney, Agent, or Firm*—Caesar, Rivise, Bernstein, Cohen & Pokotilow, Ltd.

[57] ABSTRACT

Novel rubber connectors and other rubber parts for use in human infusion sets and rubber compositions and other rubber parts for use in human infusion sets and products produced thereby, such compositions comprising by weight a major amount of rubber selected from mixtures of natural rubber and synthetic natural rubber, the novel composition further comprising by weight a minor amount of a high density polyolefin and a filler, the composition being capable of being cured with an effective amount of a peroxide curing agent and an activator to achieve cross-linking of the rubber and the high density polyolefin.

12 Claims, No Drawings

NOVEL RUBBER CONNECTORS AND OTHER RUBBER PARTS FOR USE IN HUMAN INFUSION SETS AND RUBBER

This application is a continuation of application Ser. No. 668,222, filed Nov. 5, 1984, now abandoned, which is a continuation-in-part application based on prior filed U.S. application Ser. No. 457,099 filed Jan. 10, 1983, now abandoned, and entitled "Method of Making Rubber Connectors and Other Rubber Parts for Use in Human Infusion Sets and Products Produced Thereby and Novel Compositions."

The present invention relates to a novel rubber connectors and other rubber parts for use in human infusion sets and rubber compositions, and more particularly to a novel rubber composition possessing substantial inertness and anti-coring properies, and wherein such composition is vulcanized without the use of sulfur and the various catalysts and accelerators normally used in conjunction with sulfur in the vulcanization process, but is rather cured with a combination of a peroxide and an unsaturated multifunctional cross-linking activator.

Typical human infusion sets are used in the practice of medicine in humans and animals for the transportation of various fluids such as IV and blood. The human infusion sets as shown in U.S. Pat. No. 3,886,937, the entire disclosure of which is incorporated herein by reference, generally involve tubing or other conduits as a part of a fluid flow system or network which also requires rubber parts, such as connectors, sleeve stoppers, injection sites and other typical rubber parts. These rubber parts for use in human fusion sets have generally been made of pure gum rubber and has been cured through the use of sulfur and other catalysts and accelerators. Also, it is known to make the aforesaid rubber parts from peroxide cured rubber (not using the admixed high density polyolefin of the present invention). However, such parts have been generally unsatisfactory because of poor tear strength and tackiness. Moreover, such parts usually have poor needle coring properties and poor tensile strength.

While such sulfur cured rubber parts have functioned very satisfactorily, it has been determined that powerful carcinogens and other undesirable by-products may be formed in the vulcanization process. Such deleterious substances are formed where the curing agent is sulfur and in view of the reactive nature of the various catalysts and accelerators that are usually used in conjunction with sulfur in the vulcanization process.

In view of the foregoing it is a principal object of the present invention to provide rubber connectors, sleeve stoppers, injection sites and other parts, made from a medically acceptable rubber composition for contact with medical, drug and food products, for use in infusion sets and other medically related parts, wherein the highly dispersed rubber/polyolefin is cured with the combination of a non-sulfur curing agent (peroxide) and an unsaturaturated multi-funcitional cross-linking activator, such that trace amounts of deleterious materials, such as nitrosamines are not formed in the vulcanization process and the final product has high tear strength.

Yet another object of the present invention is to produce rubber connectors, sleeve stoppers, injection sites and other rubber parts made from a medically acceptable rubber for contact with medical, drug and food products for infusion sets and other medically related parts through the use of novel rubber/polyolefin compositions.

Still another object of the present invention is to produce various rubber parts for use in human infusion sets and other medically related parts, wherein such parts are sufficiently translucent so as to reveal the presence of needles and connecting means, thereby giving a visual indication of the relationship of the translucent conduit parts being connected or joined by the rubber components or an indication of the depth of needle penetration.

Still another object of the present invention is to provide rubber connectors and other rubber parts for use in human infusion sets and other medically related parts which possess superior hardness and higher tear strength and less tackiness as compared with parts that were previously made from essentially pure gum rubber cured with peroxide or sulfur and other catalysts and accelerators usually associated with the vulcanization process.

The foregoing as well as other objects of the invention are achieved by providing a poleolefin-natural rubber and synthetic rubber composition involving synthetic cis-polyisoprene and brominated isobutylene-isoprene copolymer and mixtures thereof hereinafter referred to as the "natural and synthetic rubber component". Such blend or composition also contains as essential components a minor but significant amount of a high density polyolefin highly dispersed in the composition, as well as a filler and pigment, such as a fine particle silica. Also, a peroxide curing agent and an activator (unsaturated multifunctional cross-linking agent) are involved as will be discussed hereinafter.

As will be seen other ingredients may be present in the composition in minor amounts. Such other ingredients include an a silicone gum, a surface tack preventative, plasticizers, activators and an antioxidant. Upon formulation of all the foregoing ingredients a peroxide is added just prior to the vulcanization or molding step. Such peroxide and actuator act as the cure catalyst to cross-link the rubber component and the polyolefin component.

A preferred rubber-polyolefin formulation according to the present invention has the following seven components:

|   | Parts by Weight | |
|---|---|---|
| 1. Natsyn 2200 (Synthetic cis-polyisoprene) | 38.00 | |
| 2. #1 Pale Crepe (Natural Rubber) | 20.00 | |
| 3. Bromobutyl X-1 (Brominated Isobutylene-Isoprene Copolymer) | 10.00 | |
| 4. Masterbatch (25% High Density Polyethylene in Natural Rubber) (75%) (#1 Pale Crepe) | 40.00 (30.00 10.00 | RUBBER HDPE) |
| 5. Sartomer SR-350 (Trimethylolpropane Trimethacrylate) | 1.00 | |
| 6. 410 Silicone Gum (Methyl Vinyl Silicone Gum) | 1.00 | |
| 7. Cab-0-Sil MS-7 | 10.00 | |
|   | 120.00 | |

The first component in the aforesaid preferred rubber-polyolefin formulation is a synthetic version of natural rubber. The synthetic version has the advantage of giving less of an amber discoloration as compared with natural rubber. This is because the synthetic material does not possess proteins which are to be found in true natural rubber. However, where desired this synthetic version of natural rubber may be eliminated.

The second component is a pale crepe which is a natural rubber. Other grades of natural rubber may be used, depending on the color desired. Also, the natural rubber component may be partly or completely replaced by synthetic natural rubber, such as the first component.

The third component is Bromobutyl which is included in the formulation to include age resistance as well as having a superior factory processing properties. Where desired the Bromobutyl can be completely eliminated or interchanged with one or both of the first two components. Bromobutyl may be present from 0 to 50 parts by weight.

The fourth component is a specially prepared masterbatch mixture of 75% natural rubber and 25% high density polyethylene. Thus, the rubber-polyolefin composition disclosed hereinabove comprises 98 parts by weight of rubber components and 10 parts by weight of polyethylene.

The presence of the synthetic rubber has the effect of lightening the color of the overall composition as well as adding a significant degree of translucency.

The high density Polyethylene can be varied from about 5 to 25 parts by weight in the 110 total parts by weight (plus other additives) of the aforesaid formulation. The ratio of high density polyethylene to the natural rubber in the fourth component may be varied to supply the desired amount of high density polyethylene in the final formulation. Thus, the fourth ingredient could comprise 15 parts by weight of rubber and 25 parts by weight of high density polyethylene to provide the preferred maximum amount of high density polyethylene.

The actual amount of high density polyethylene present in the final formulation depends upon the degree of hardness that is desired in the vulcanized rubber. For instance, the hardness of the vulcanized rubber can be varied from 35 Duro A hardness to 70 Duro A hardness when the high density polyethylene is present in an amount of 25 parts by weight of the 110 parts by weight (plus other additives) of the above stated formulation. The range of 35 Duro A hardness to 70 Duro A hardness is the usual range for pharmaceutical/medical grade rubber. While polyethylene may be present in a proportion greater than 25 parts, it is found that the resulting product may lack rubber-like qualities.

The above stated formulation also includes Sartomer SR-350 (trimethylol propane trimethacrylate) as a fifth component. This is an unsaturated multifunctional cross-linking agent which is an activator and co-agent for peroxide cures. While this component can be eliminated, the result of such elimination would be to require higher amounts of peroxide curing agent. Other activators may also be used such as those disclosed in U.S. Pat. No. 3,261,888, the entire disclosure of which is incorporated by reference. Such other activators include various acrylates, such as diacrylates, bis-acrylates, dimethacrylates, bismethacrylates. Other unsaturated multifunctional cross-linking agents, such as N,N'-m-phenylenedimaleimide may also be used.

The sixth component in the above stated formulation is a silicone gum which is used to improve the processing properties. This component can also be eliminated although its presence is desirable.

As will be discussed additional desirable additives are included in the above noted formulation as well as a peroxide cure catalyst. The peroxide cure catalyst is 2,5dimethyl-2,5 di(t-butyl peroxy)hexane (sold under Trademarks Varox and Lupersol 101) that is present in an amount of 1 part by weight. The peroxide is the critical ingredient which cross-links both the rubber component and the polyolefin component as contrasted with the action of peroxide cures without polyolefin (which cross-links only the rubber) or sulfur which vulcanizes and cross-links only the rubber component. Other peroxides, such as dicumyl peroxide, that cross-link hydrocarbon-type rubbers and plastics, can be used in place of the Varox liquid.

The preferred polyolefin is high density polyethylene having a density of at least 0.915 and more preferably 0.965 or greater, with a percentage crystallinity as determined by nuclear magnetic resonance at room temperature of approximately 80 or more, and preferably 90 or greater. Other high density polyolefins, such as high density polypropylene may also be used in connection with the invention.

In addition to the aforesaid six components of the rubber-polyolefin formulation, there is the seventh component which is a fine particle silica or other inorganic filler-reinforcing agent (hereinafter referred to as filler) which may also be regarded as a pigment to achieve transparent or translucent properties. The filler achieves transparency in the finished product as well as improving tensile strength and tear strength. Other fillers may be used in varying amounts depending upon the desired properties in the finished product.

A preferred filler is fumed, coloidal silica known as Cab-O-Sil MS-7 (fumed hydrolyzed silica-0.014 micron particle size) which is preferably present in 20 parts by weight on the basis of 100 parts by weight of the rubber-polyolefin formulation. Other inorganic fillers, normally used in the rubber industry, can be used as the filler of the present invention. These include clay, blanc fixe and talc. The preferred filler is a very pure silica.

The amount of filler is usually varied from 5 to 60 or more parts, depending upon the filler used and the desired Durometer A Hardness. Higher amounts of a given filler have the effect of increasing the Durometer A Hardness which is also dependent upon the amount of high density polyolefin which is present. The filler is present in an amount by weight of at least 4% and preferably 8% to a preferred maximum of about 20%. However, the filler may be present in amounts as high as 40% by weight where the product is opaque or does not require good coring properties. Thus, the Durometer A Hardness of the final product can be established by appropriate adjustment of the relative amount of rubber component, high density polyolefin and filler. In the practice of the present invention a final product of 55±5 at a 30 minute cure at 330° F. (137° C.) Durometer A Hardness was achieved where for each 100 parts by weight of total rubber content, there were 10 parts by weight of high density polyethylene and 20 parts by weight of Cab-Sil MS-7. At times more than 60 parts of the filler can be used, depending upon the particular filler and its particle size and surface area.

Small amounts of additives are used to impart desirable properties to the finished, cured composition. A low molecular weight low density polyethylene (A-C Polyethylene 617) is preferably present in the amount of 2 parts by weight to 100 parts by weight of rubber formulation, and is not a critical ingredient. This ingredient is to improve processing properties and can be eliminated with no significant change in the vulcanized properties of the final product.

It is also desirable to include a microcrystaline petroleum wax (sold under the Trademark Vanwax H) in an amount of 1 part by weight to 100 parts by weight of rubber formulation. This ingredient is used to prevent surface tack on the finished washed parts. A trace diffuses to the surface, giving a protective film of wax and also preventing surface tack.

Another additive is white petrolatum, U.S.P. grade (Petrolatum B) in an amount of 1 part by weight to 100 parts by weight rubber formulation. This ingredient is a plasticizer that improves processing properties.

Yet another additive is zinc stearate in an amount of 0.5 parts by weight to 100 parts by weight rubber formulation. This ingredient is an activator for the vulcanization reaction. It is also a stabilizer, improving age resistance.

Yet another additive is stearic acid, double pressed, which is present in an amount of 0.5 parts by weight to 100 parts by weight rubber formulation. This ingredient is an activator.

Another ingredient is Antioxidant #425, a trademark of American Cyanamid Co., (2,2'Methylenebis 6-tert-butyl-4-ethylphenol) which is present in an amount of 0.5 parts by weight to 100 parts by weight rubber formulation. This ingredient improves age resistance and heat resistance.

Finally, there is a plasticizer preferrably incorporated in a ratio of 1 part by weight to 100 parts by weight rubber formulation. This plasticizer is a synthetic polyterpeneresin (Nevtac 100).

As will be seen, an important feature of the invention is that the final molded rubber parts are fully cured to yield a vulcanizate that is insoluble in most solvents and therefore is substantially inert. With the present invention both the rubber component and the polyolefin component are fully cured in order to achieve the aforesaid insolubility property which is an essential property of pharmaceutical/medical grade rubber.

MANUFACTURING METHODS

The first preferred manufacturing method involves the first step of preparation of a Masterbatch in a #3 Banbury mixer with a volume of 116 lb. at a specific gravity of 1.0 and having of motor of 300 horsepower with the rotory of the Banbury run at 70 R.P.M. A Masterbatch weighing 120 pounds (54.48 kilograms) was prepared by the admixing of 90 pounds (40.86 kilograms) #1 thick crepe (NR) and 30 pounds (13.62 kilograms) of high density polyethylene (Soltex T60-2000) also known as HDPE. The components were initially brought together at 100° F. (38° C.) for 30 seconds in the Banbury mixer. The temperature was raised to 200° F. (94° C.) and mixing continued for an additional 2 minutes. With continued mixing the temperature increased to 300° F. (150° C.) for an additional 3 minutes. The mixed components were then brought to a temperature of 350° F. (178° C.) with an additional 2½ minutes of mixing. The foregoing constitutes vigorous mixing to achieve a highly dispersed product wherein heat is internally generated during mixing. No external heat is usually added.

The Masterbatch of highly dispersed natural rubber and high density polyethylene produced through the foregoing procedure was then transferred to a 60 inch batch-off mill, blended and then cut into slabs having approximate dimensions of two feet (61 cm.) by five feet (1.42 m.) and an approximate thickness of ¾ inch (1.91 cm.). The slabs were dipped in an aqueous solution of zinc stearate to enable the slabs to be readily separated from one another. Forty pounds of the Masterbatch at room temperature were used in the second step of this manufacturing method, in the following formulation to make a typical composition:

|  | LBS. | OZS | GRAMS |
| --- | --- | --- | --- |
| Natsyn 2200 | 38 | 0 | 17,024 |
| #1 Crepe | 20 | 0 | 8,960 |
| Bromobutyl X-2 | 10 | 0 | 4,480 |
| Masterbatch (10 HDPE, 30 NR) | 40 | 0 | 17,920 |
| Sartomer 350 | 1 | 0 | 448 |
| 410 Silicone Gum | 1 | 0 | 448 |
| Cab-0-Sil MS-7 | 20 | 0 | 8,960 |
| Polyethylene 617 | 2 | 0 | 896 |
| Vanwax H | 1 | 0 | 448 |
| Petrolatum B | 1 | 0 | 448 |
| Zinc Stearate | 0 | 8 | 224 |
| Stearic Acid | 0 | 8 | 224 |
| Antioxidant 425 | 0 | 8 | 224 |
| Nevtac 100 Resin | 1 | 0 | 448 |
| SUBTOTAL | 136 | 8 | 61,152 |
| *Varox Liquid | 1 | 0 | 448 |
| TOTAL | 137 | 8 | 61,600 |

*Added on Warm-Up Mill
Shore A Hardness: 55 ± 5
Specific Gravity: 1.00 ± .05
Cure: 30' @ 330° F. (167° C.)
% Ash: 14.6% ± 2.0%
Color: Amber-Transparent
NOTE:
Stock must be used within 2 weeks after adding Varox Liquid on warm-up mill and within 1 week after tubing.

The addition sequence of adding the foregoing ingredients to the Banbury mixer was as follows with the Banbury mixer rotor adjusted to 70 R.P.M.:
1. #1 Crepe
2. Natsyn 2200
3. Bromobutyl X-2
4. HDPE Masterbatch
5. Sartomer 350
6. 410 Silicone Gum
7. Cab-O-Sil MS-7
8. Polyethylene 617
9. Vanwax H
10. Petrolatum B
11. Zinc Stearate
12. Stearic Acid
13. Antioxidant 425
14. Nevtac 100 Resin The initial temperature was 120° F. (49° C.) which was then raised to 150° F. (66° C.). For the next 4¾ minutes the temperature was gradually raised to 300° F. (150° C.) with constant mixing and agitation in the Banbury mixer. The mix is then removed from the Banbury mixer and formed into slabs as with the masterbatch and then dipped in a zinc stearate solution as before.

The only component not immediately added is the peroxide or Varox liquid. The Varox Liquid or other curing peroxide is added in a separate operation at a lower temperature to prevent pre-curing. This would preferably be just prior to the extrusion step when the aforesaid ingredients and the peroxide are extruded in a long rod having an approximate diameter of ⅛" to ¾" (3.175 mm to 19.05 mm) and then cut into plugs having a thickness of ⅛" to ¾" (3.175 mm to 19.05 mm) or cut into smaller chips. These plugs or chips are then used in connection with a rubber molding press to produce the finished product at 330° F. (167° C.) to 360° F. (184° C.) and a 15 to 30 minute molding time in the press. These temperatures and times may vary somewhat depending upon the final product to be produced. This will produce the various connectors, stoppers, etc. with the low leaching rate in accordance with the present invention.
Physical Properties:

The physical properties of the above typical composition when vulcanized for 30 minutes @ 330° F. (167° C.) are as follows:

| | |
|---|---|
| Tensile Strength, psi | 2975 (209.14 kg./cm$^2$.) |
| % Elongation | 625 |
| Durometer A Hardness | 55 |
| Specific Gravity | 1.01 |

Pharmaceutical Physicochemical Extraction Test:

When tested in accordance with the U.S. Pharmacopeia XX, p. 918, Elastomeric Closures for Injections, Physicochemical Test Procedure (copy of Tompkins detailed test procedure attached), the typical composition above tests as follows:

| | |
|---|---|
| Turbidity (Nephelos) | 2.0 |
| Ph | 5.70 |
| pH Change | −.62 |
| I$_2$ ml .01 N | −.01 |

These extraction test results indicate very low amounts of extractables, which should be quite acceptable for pharmaceutical applications. Toxicity Tests: USPXX, p. 917 Biological Toxicity test results. There were also excellent results for cytotoxicity using Mouse cells and Human Blood Hemolysis test results. The above typical composition showed lack of any toxicity in all of these tests.

The finished molded parts may include needle puncture indicators and other molded-in marks. The rubber parts made by the teachings of the present invention have high tear strength and thus needle punctures are generally confined to the actual area of penetration.

The foregoing manufacturing method is accordingly regarded as a two-step process. Another preferred manufacturing method involves essentially the same components as the formulation used in the two-step process, but does not require the formation of a masterbatch. Instead, the following are placed in a Banbury mixer having a 300 horsepower motor in a one-step process:

| | LBS. | OZS | GRAMS |
|---|---|---|---|
| Natsyn 2200 | 38 | 0 | 17,252 |
| #1 Crepe | 50 | 0 | 22,700 |
| Bromobutyl X-2 | 10 | 0 | 4,540 |
| Polyethylene T-60-2000 | 10 | 0 | 4,540 |
| Sartomer 350 | 1 | 0 | 454 |
| 410 Silicone Gum | 1 | 0 | 454 |
| HISIL 233 | 20 | 0 | 9,080 |
| Polyethylene 617 | 2 | 0 | 908 |
| Vanwax H | 1 | 0 | 454 |
| Petrolatum B | 1 | 0 | 454 |
| Vanfre AP-2 | 1 | 0 | 454 |
| Nevtac 100 | 1 | 0 | 454 |
| Wingstay L | 0 | 4 | 113 |
| SUBTOTAL | 136 | 4 | 61,857 |
| *Varox Liquid | 1 | 0 | 454 |
| TOTAL | 137 | 4 | 62,311 |

*Added on Warm-Up Mill

The above formulation may be regarded as a one-step procedure since there is no prior preparation of a masterbatch. It will be seen that the one-step formulation has the same rubber content as the masterbatch-two-step formulation previously dicussed. The difference is that in the two-step-masterbatch formulation 30 pounds (13.62 kilograms) #1 crepe are used with 10 pounds (4.54 kilograms) of high density polyethylene to form the masterbatch, with an additional 20 pounds (9.08 kilograms) of #1 crepe being added in the second step.

With the one-step process the total of 50 pounds (22.7 kilograms) of #1 crepe is added at the same time as the other ingredients. Also, 10 pounds (4.54 kilograms) of the high density polyethylene are also added in the single mix.

Other differences between the one-step and two-step processes involve the elimination of the zinc stearate and stearic acid components of the two-step process. Instead, the one-step process uses 1 pound (0.454 kilograms) of Vanfre AP-2 which aids in mixing and molding. Also, the one-step process uses Wingstay L which is a process aid and antioxidant. HISIL 233 is an alternative filler used in place of Cab-O-Sil. It is a precipitated hydrated silica having 0.022 micron particle size. This replacement has nothing to do with the one-step nature of the process since Cab-O-Sil can be readily used in the one-step process. With both the one-step and two-step processes the Varox liquid is preferably not added until the warm-up mill step which is just prior to the extrusion step. Once the plugs or chips have been formed, it is preferred that the molding operation occur within one to two weeks since the Varox liquid will tend to volatilize.

The one-step manufacturing method involves placing the ingredients in the Banbury mixer in the same sequence as items numbers 1 to 14 as discussed in connection with the two-step process except that polyethylene T-60-2000 is utilized in place of #4 of the two-step process which is the masterbatch. The zinc stearate and stearic acid components (items #11 and #12) of the two-step process are eliminated in the one-step process. However, the one-step process uses Vanfre AP-2 and Wingstay L for purposes previously discussed. Also, antioxidant 425 (item #13 of two-step process) does not appear in the one-step process.

Once all the ingredients have been place in the Banbury #3 mixer (with the same capacity and rotor R.P.M. as before) the temperature is brought to 150° F. (66° C.). After 45 seconds the temperature increases to 155° F. (69° C.). After 2 minutes and 15 seconds the temperature was observed at 200° F. (94° C.). Upon further mixing and ramming the temperature reached 350° F. (178° C.) after 7 minutes. Finally, after 8 minutes of mixing the temperature reached 375° F. (192° C.). Thus, the one-step process is run to a somewhat higher temperature as compared with the two-step process.

The final mixed product is formed into slabs and dipped and cooled as with the product of the second step of the two-step process. The final mixed product (prior to vulcanization) was found to possess the highly dispersed property of rubber and polyolefin as existed with the two-step process. When needed, the one-step product was fed to the extruder. At the warm-up mill of the extruder the Varox liquid was added.

Product made from the plugs and chips produced by the one-step process, was found to possess all of the significant features of a product in accordance with the present invention that was made by the two-step process.

From the foregoing it can be seen that the present invention involves a major amount by weight of natural rubber and synthetic rubber component, and minor amounts by weight of a high density polyolefin (or mixtures of high density polyolefin) and varying amounts by weight of at least one filler. There will also be a sufficient or an effective amount of the peroxide curing agent and activator to achieve cross-linking of the highly dispersed rubber and polyolefin components to produce a lighter color, translucent product.

The natural and synthetic rubber component should be present in an amount by weight of at least 40%, usually 60%, and preferably 70% or more. The high density polyolefin is preferably present in an amount by weight of at least about 4% and preferably from about 8% to a maximum of about 20%. The filler component can be eliminated, but is preferably present in an amount by weight of at least about 4% and preferably from about 8% to a maximum of about 20% or more up to 60% where the filler is of a relatively large particle size as compared with Cab-O-Sil and HISIL.

From the foregoing description it can be seen that the present invention successfully produces rubber parts for medical use, particularly inhuman infusion sets. Such rubber parts are made from a medically acceptable rubber composition, for contact with medical, drug and food products. Such rubber parts are exemplified by connectors, sleeve stoppers, injection sites and other typical vial stoppers, syringe plungers, lyopholize stoppers, sleeve stoppers, urine ports, irrigation sites, fluid transfer valves, needle covers, baby bottle nipples, dialysis machine parts and catheter seals.

Without further elaboration the foregoing will so fully illustrate our invention that others may, by applying current or future knowledge readily adapt the same for use under various conditions or service.

I claim:

1. A medically acceptable rubber composition to make into rubber products for contact with medical, drug and food products, said composition when cured having high tear strength and being substantially inert, said composition including at least 40% by weight of rubber comprising a mixture of brominated isobutylene-isoprene copolymer and a material selected from the group consisting of natural rubber and synthetic cis-polyisoprene, said composition further comprising a well-mixed minor amount of a polyolefin, with said composition being cured under static conditions at vulcanization temperature, and an effective amount of peroxide curing agent having been added to said composition at a lower temperature prior to curing, to achieve substantially complete cross-linking of the rubber and the polyolefin.

2. The rubber composition of claim 1 wherein said rubber comprises a mixture of brominated isobutyleneisoprene copolymer, natural rubber and synthetic cis-polyisoprene.

3. The rubber composition of claim 1 further including a filler.

4. The rubber composition of claim 3, wherein said rubber is present in an amount by weight of 60% and preferably 70%.

5. The rubber composition of claim 3, wherein the high density polyolefin is present in an amount by weight of at least about 4% and preferably 8% to a maximum of about 20%.

6. The rubber composition of claim 3, wherein said filler is present in amount by weight of at least about 4% and preferably 8% to a preferred maximum of about 20%.

7. The rubber composition of claim 3, wherein said rubber is a mixture of natural rubber, synthetic cis-polyisoprene and brominated isobuylene-isoprene copolymer.

8. The rubber composition of claim 3, comprised of the following:

|  | LBS. | OZS. |
| --- | --- | --- |
| Synthetic cis-polyisoprene | 38 | 0 |
| Natural Rubber | 50 | 0 |
| Brominated Isobutylene-Isoprene Copolymer | 10 | 0 |
| High Density Polyethylene | 10 | 0 |
| Trimethylolpropane Trimethacrylate Activator and Co-Agent | 1 | 0 |
| Silicone Gum | 1 | 0 |
| Filler | 20 | 0 |
| Low Molecular Weight Polyethylene | 2 | 0 |
| Microcrystalline Petroleum Wax | 1 | 0 |
| White Petrolatum | 1 | 0 |
| Peroxide | 1 | 0 |

9. The rubber composition of claim 1, wherein the well mixed rubber and polyolefin is extrudable.

10. The rubber composition of claim 1, cured in a mold.

11. The composition of claim 3, and further including additives to improve processing properties, age resistance and heat resistance and at least one plasticizer, activator and stabilizer.

12. The composition of claim 3 of which possesses translucent properties.

* * * * *